United States Patent
Witwer

(10) Patent No.: US 12,374,972 B2
(45) Date of Patent: Jul. 29, 2025

(54) METHOD FOR PRODUCING A COIL WINDING FOR INSERTION INTO RADIALLY OPEN SLOTS OF STATORS OR ROTORS OF ELECTRICAL MACHINES

(71) Applicant: Schaeffler ELMOTEC STATOMAT GmbH, Karben (DE)

(72) Inventor: Keith A. Witwer, Fort Wayne, IN (US)

(73) Assignee: Schaeffler ELMOTEC STATOMAT GmbH, Karben (DE)

( * ) Notice: Subject to any disclaimer, the term of this patent is extended or adjusted under 35 U.S.C. 154(b) by 566 days.

(21) Appl. No.: 17/624,359

(22) PCT Filed: Jul. 2, 2020

(86) PCT No.: PCT/EP2020/068683
§ 371 (c)(1),
(2) Date: Jan. 3, 2022

(87) PCT Pub. No.: WO2021/001483
PCT Pub. Date: Jan. 7, 2021

(65) Prior Publication Data
US 2022/0360150 A1 Nov. 10, 2022

(30) Foreign Application Priority Data
Jul. 3, 2019 (DE) .................... 10 2019 117 966.1

(51) Int. Cl.
*H02K 15/043* (2025.01)
*H02K 15/066* (2025.01)
*H02K 15/35* (2025.01)

(52) U.S. Cl.
CPC ....... *H02K 15/0433* (2025.01); *H02K 15/066* (2013.01); *H02K 15/35* (2025.01)

(58) Field of Classification Search
CPC ................ H02K 15/0478; H02K 15/0433
See application file for complete search history.

(56) References Cited

U.S. PATENT DOCUMENTS

| 2004/0000832 A1 | 1/2004 | Isogai et al. |
| 2017/0047830 A1 | 2/2017 | Darras et al. |
| 2018/0331606 A1 * | 11/2018 | Sadiku ............... H02K 15/0478 |

FOREIGN PATENT DOCUMENTS

| DE | 102015120661 | 6/2017 | |
| DE | 102015120661 A1 * | 6/2017 | ......... H02K 15/0478 |

(Continued)

OTHER PUBLICATIONS

Internationaler Recherchenbericht und Schriftlicher Bescheid [International Search Report and the Written Opinion] Dated Oct. 29, 2020 From the International Searching Authority Re. Application No. PCT/EP2020/068683 and Its Translation of Search Report Into English. (15 Pages).

(Continued)

*Primary Examiner* — Livius R. Cazan

(57) ABSTRACT

The invention relates to a method for producing a coil winding (70) for insertion into radially open slots (82) in a rotor or stator (80) of an electrical machine, wherein the coil winding (70) has a wire pack (60) consisting of a number of wires (32), wherein the wires (32) of the wire pack (60) run parallel to one another and are connected to one another in pairs at one end of the wire pack (60), and wherein the coil winding (70) is formed by a flat winding former which can be rotated about an axis of rotation (26). According to the method, the wire pack (60) is fixed on a winding former (26) and winding heads (42) are produced by displacing fixations of the wire pack (60). The winding shaft (26) can be rotated so that, after carrying out the method, a coil winding (70) is present in the form of a wave winding having wires (32) of the wire pack (60) preconnected in pairs at one end. Such a method allows a particularly space-saving coil winding (70)

(Continued)

to be produced, which has a particularly high mechanical stability and requires the least amount of installation space in a rotor or stator (80).

11 Claims, 16 Drawing Sheets

(56) References Cited

FOREIGN PATENT DOCUMENTS

| | | | | |
|---|---|---|---|---|
| JP | 2004-088993 | 3/2004 | | |
| JP | 2004088993 A * | 3/2004 | ............... | H02K 3/28 |
| JP | 2018-535639 | 11/2018 | | |
| WO | WO 2017/089455 | 6/2017 | | |
| WO | WO 2017/089754 | 6/2017 | | |

OTHER PUBLICATIONS

Translation of Notice of Reasons for Rejection Dated Mar. 5, 2024 From the Japan Patent Office Re. Application No. 2021-575461. (6 Pages).

\* cited by examiner

METHOD FOR PRODUCING A COIL WINDING FOR INSERTION INTO RADIALLY OPEN SLOTS OF STATORS OR ROTORS OF ELECTRICAL MACHINES

RELATED APPLICATIONS

This application is a National Phase of PCT Patent Application No. PCT/EP2020/068683 having International filing date of Jul. 2, 2020, which claims the benefit of priority of German Patent Application No. 10 2019 117 966.1 filed on Jul. 3, 2019. The contents of the above applications are all incorporated by reference as if fully set forth herein in their entirety.

FIELD AND BACKGROUND OF THE INVENTION

The invention relates to a method for producing a coil winding for insertion into radially open slots in a rotor or stator of an electrical machine, wherein the coil winding is formed by a flat winding former which can be rotated about an axis of rotation.

The method is also particularly suitable for the use of wires which are substantially rectangular in cross section and which are preferred with regard to an optimal degree of filling in the slots of the stator. Conventional winding methods for round wire cannot be used for wire cross sections of this type.

The present method primarily serves to produce a coil winding as a so-called distributed wave winding, which can then be inserted into the slots of a stator (or rotor). Such a coil winding or distributed wave winding is also referred to as a bar wave winding.

A distributed wave winding has a plurality of parallel wires having straight portions that are arranged in the slots of a stator. These straight portions alternate between an inner and an adjacent outer radial position in the stator as the wire pattern moves radially around the stator. This distributed wave pattern contains a number X of phases or grouped slots in the stator. In general, X is a multiple of 3, but constructions are also possible in which X is any other integer. Likewise, it is also possible to provide a wave winding without alternating the straight portions with respect to adjacent open slots in a stator or rotor.

The exact appearance of the winding to be produced will be discussed in more detail in the context of the embodiment.

A method for producing such a winding is known from DE 10 2015 120 661 A1, which method is based on a continuous wave winding. In this case, a coil winding is produced for insertion into radially open slots of stators or rotors of electrical machines, the coil winding consisting of a number of interwoven wires that are repeatedly bent over in opposite directions so that parallel legs of the wires, which are intended to fill the slots, are connected by roof-like winding heads which protrude over the rotors or stators at the end side. A flat and rotatable winding former is used in this case. The coil winding, which is inserted into the stator, has open ends at both ends of the wave winding, which open ends are formed by portions of the wires.

In particular in applications with three electrical phases, open wire ends must be connected at one end of the wave winding or the coil winding if more than three wires are wound to form a wave winding or coil winding. This connection takes place by specially provided connection pieces or by permanent bonded connection of the wire ends after inserting the wave winding or the coil winding into the stator or rotor or after finishing the production of the coil winding. In such a case, additional installation space is required for a connection of this type by means of connection pieces and/or the electrical contact is impaired by transition resistances and/or material differences. In addition, an additional assembly step is necessary when equipping the stator or the rotor with regard to the electrical configuration of the coil winding.

SUMMARY OF THE INVENTION

The object of the present invention is to provide a method of the type mentioned at the outset which simplifies the production of a stator or a rotor having a wave winding or coil winding and to allow reliable and space-saving operation of an electrical machine with such a stator or rotor.

According to the invention, the object is achieved by a method of the type mentioned at the outset, wherein a coil winding has a wire pack consisting of a number of wires, wherein the wires of the wire pack run parallel to one another and are connected to one another in pairs at one end of the wire pack, comprising the method steps of:
a) feeding the wire pack used for the coil winding perpendicular to the winding former;
b) holding the wire pack at a fixing point in a first holding region on the winding former;
c) holding the wire pack at a fixing point in a second holding region at a distance in front of the winding former with respect to the feed direction;
d) displacing the first holding region relative to the second holding region in a direction parallel to the axis of rotation of the winding former to form a wire portion inclined with respect to the feed direction between the first holding region and the second holding region;
e) rotating the winding former by 180° about the axis of rotation while feeding the wire pack from the feed direction, wherein the fixing point is displaced from the first holding region into a third holding region on the side of the winding former opposite the first holding region, and the fixing point is displaced from the second holding region into the first holding region, whereby a winding head extending around the winding former is formed for the wire pack with the formation of a bending region;
f) fixing the subsequently fed wire pack at the fixing point in the second holding region;
g) repeating steps d) to f), the holding effect at the fixing point in the third holding region being released before or after the repetition of step f) and the holding effect at the second fixing point being released before the repetition of step e);
h) repeating steps b) to g) until the coil winding is complete;
i) severing the wire pack in a region of the second holding region;
j) stripping the coil winding from the winding former.

The fact that the method is carried out with a wire pack in which the wires of the wire pack run parallel to one another and are connected to one another in pairs at one end of the wire pack results in the advantage that the wires do not have to be connected subsequently, i.e., after the production of the coil winding or after the installation of the coil winding into a rotor or stator core with open slots. This considerably simplifies the production of stators or rotors with wave windings or coil windings. The wire pack from which the coil winding is produced can be pre-assembled with respect to the electrical configuration by providing corresponding connections.

This pre-assembly with regard to the electrical line routing in the wire pack also increases the safety of the electrical connection of the conductors in the coil winding. After the installation of the coil winding into the rotor or stator, a subsequent connection of the corresponding wires of the wire pack, from which wire pack the coil winding is constructed, can be dispensed with. The assembly of the electrical connections can advantageously take place under ideal conditions in advance and not only in the installed state of the coil winding in the stator or rotor. This ensures that an optimal connection of the wires to be connected takes place. In contrast, the subsequent connection of wires from coil windings in the installed state in a stator or rotor is often only possible with a clamp connection or screw connection, thereby resulting in lower reliability.

Furthermore, it is advantageous that the connection can be made particularly space-saving in this way since the wires have to be connected to one another individually prior to the production of the wave winding or the coil winding. Thus, smaller dimensions, in particular in the axial direction, can be achieved for the rotor or stator.

Preferred embodiment of the method the method is carried out with a wire pack in which the wires of the wire pack run parallel to one another and are connected to one another in pairs at one end of the wire pack.

In a further embodiment of the invention, it is provided that the wire pack is first produced in that twice the length of the wires required for the coil winding is determined, and the wire pack is produced by bending over the wires to the length required for the production of the coil winding, so that the wires are connected to one another in pairs at one end of the wire pack.

As a result, the wires connected to one another in pairs are formed in one piece, since they are constructed from one wire. There is therefore no need to produce a separate connection. This is advantageous because a wire pack produced according to this method is particularly space-saving and produces a particularly secure connection between the wires in pairs.

According to a further embodiment of the invention, it is provided that the wire pack, beginning with the end at which the wires are connected to one another in pairs, is fed perpendicular to the winding former.

Such a feed results in the advantage that the end with the wires connected in pairs is first arranged on the winding former. Connecting the wires in pairs increases the integrity of the arrangement of the wires on the winding former. In addition, there is the further advantage that an open end of the wire pack, on which no wires connected to one another in pairs, is arranged on the feed side. As a result, the arrangement of the wires within the wire pack can be changed during the feed thereof, so that the sequence of the wires on the winding former can be designed in a variable manner.

In a further embodiment of the method, it is provided that the displacement in method step d) takes place parallel to the axis of rotation of the winding former by a section, the length of the section being approximately equal to half the distance between the outermost wires of the wire pack in relation to all wires, whereby a wire portion inclined with respect to the axis of rotation of the winding former is formed between the first and the second holding region.

By providing an amount of displacement, the length of which is approximately equal to half the distance between the outermost wires in relation to all wires, an inclined wire portion is formed with an advantageous geometry for the installation of a coil winding in open slots of a rotor or stator. The coil winding produced in this way can be inserted into the open slots of the stator or the rotor in a space-saving manner, without the geometry of the wave winding or coil winding hindering the use thereof. In particular, this configuration is advantageous because it is also possible to form winding heads which only protrude minimally in an axial direction beyond the body of a core of a stator or a rotor.

According to a further aspect of the method, it is provided that the winding heads are reshaped in the bending region formed by step e). To this end, it is provided that, for the final shaping of the winding heads after method step e), a profiled shaping tool is pressed against the winding heads.

Reshaping can compensate for any irregularities in the shape of the winding heads. The reshaping also serves in particular to further reduce the protrusion of the winding heads over the stator core or rotor core.

According to a further embodiment, it is provided that the wire pack is held in step b) by means of a first holding device on the winding former in the first holding region and in step c) by means of a second holding device in the second holding region.

According to a further embodiment of the invention, it is preferably provided for each of the holding devices that their individual displacement is possible parallel to the axis of rotation of the winding former so that steps b) to d) of the method can be carried out. Such holding devices can be designed as active clamps or guide channels through which the wires run or which are placed on the wires. It can therefore suffice to place holding devices with a suitable geometry on the wires, which then offer sufficient hold against slipping through during lateral displacement. The clamping device, which is used in the second holding region, is part of a wire or wire pack feed in an advantageous embodiment of the invention. In a further optional embodiment of the invention, the clamping device in the second holding region contributes to producing a mechanical tension in the wire pack or the wires between this clamping device and the clamping device in the first holding region. As an alternative or in addition thereto, the clamping device in the second holding region can produce a mechanical tension in the wire pack or the wires between a wire feed and this clamp. According to a further aspect of the invention, the holding devices are not tied to the corresponding holding region but can be moved between the three holding regions so that they can maintain the holding effect not only during their displacement but also during the rotation of the winding former.

A further embodiment of the invention results in that the first holding region, the third holding region and the second holding region follow one another in this order in the direction of rotation of the winding former, and each holding device is transferred with a rotation in accordance with step e) from a holding region to a subsequent holding region in the direction of rotation.

In this way, the release of the holding effect in the third holding region can take place, for example, before step f), and the displacement of the holding device from the third to the second holding region can be carried out during the next rotation process of the winding former. The holding devices move during the rotation processes of the winding former from the first to the third holding region, then during the next rotation process from the third to the second holding region, and finally again from the second to the first holding region, from where the sequence of movements is repeated in the case of a further rotation of the winding former.

According to a further embodiment of the invention, it is provided that the severing of the wire pack in step i) takes place in a rotary position of the winding former, in which rotary position the end of the wire pack with the wires connected to one another in pairs lies on the side of the second holding region.

This results in a particularly advantageous way that the beginning and the end of the coil winding or of the wire pack are arranged, viewed axially, on the same side of a rotor or stator in an inserted state. This facilitates the electrical connection and any access to the connection of the wires in pairs, if this should be necessary. According to a further aspect of the invention, it is provided that the severing of the wire pack in step i) takes place in a rotary position of the winding former, in which rotary position the end of the wire pack with the wires connected to one another in pairs lies on the opposite side of the second holding region. In the case of such a method sequence, the arrangement of the open ends of the coil winding, viewed axially after the installation of the coil winding into a rotor or stator, can be on another side of the rotor or stator, which can result in advantages in particular with regard to the connection and the utilisation of installation space.

According to a further aspect of the invention, it is provided that the wires connected in pairs are exchanged once or multiple times in pairs with other wires connected in pairs in the course of the method during the feed before reaching the second holding region.

By interchanging the wires connected to one another in pairs, a coil winding inserted into open slots of a rotor or stator has the advantage in terms of current conduction that the wires connected in pairs can each assume different positions in the open slots, viewed radially. This advantageously reduces the occurrence of eddy currents.

In an alternative embodiment of the method, it is provided that the wire pack is cut to length before the implementation of method step a), and the feed of the wire pack used for the coil winding in step a) with the wires not connected to one another in pairs at one end of the wire pack takes place in a feed direction perpendicular to the winding former, and that step i) is omitted.

In this way, the method is somewhat simpler, since one method step is omitted. Naturally, this results in a shorter cycle time. In addition, on the wire feed side, the wires connected to one another in pairs provide better integrity of the wire pack, so that the wire feed can be configured more simply.

A further aspect of the invention, a wire pack for use in the method according to the invention with an embodiment according to which the wire pack has a number of wires running parallel to one another, which are each connected to one another in pairs at one end of the wire pack. According to this embodiment, it is provided that the wires connected to one another in pairs are formed in one piece from a continuous single wire which is bent over at one end of the wire pack, the shape of the bending of all continuous wires corresponding to the shape of a winding head.

This pre-assembly with regard to the electrical line routing in the wire pack also increases the safety of the electrical connection of the conductors in the coil winding. After the installation of the coil winding into the rotor or stator, a subsequent connection of the corresponding wires of the wire pack, from which wire pack the coil winding is constructed, can be dispensed with. The assembly of the electrical connections can take place under ideal conditions in advance and not only when the coil winding is in the installed state in the stator or rotor. This ensures that an optimal connection of the wires to be connected takes place. In contrast, the subsequent connection of wires from coil windings in the installed state in a stator or rotor is often only possible with a clamp connection or screw connection, thereby resulting in lower reliability. By providing a one-piece connection, there is no need to produce a separate connection. This is advantageous because such a wire pack is particularly space-saving and produces a particularly secure connection between the wires in pairs.

According to a further aspect of the invention, to a stator or rotor of an electrical machine having a coil winding produced according to the method according to the invention and according to a further embodiment according to which a coil winding produced by means of the method is inserted into the slots in such a way that a first half of wires of the coil winding arranged between two winding heads is inserted into a first slot of two successive slots, and a second half of wires of the coil winding arranged between two winding heads is inserted into a second slot of two successive slots. According to this embodiment, it is provided that the end of the coil winding with the wires connected to one another in pairs and the end of the coil winding with the severed wire pack lie on the same side of the stator or the rotor.

Inserting a coil winding produced by the method into a rotor or stator or a rotor core or stator core results in the advantage that this rotor or stator or rotor core or stator core can be designed to be particularly space-saving, since the wires must be individually connected to one another prior to the production of the wave winding or the coil winding. Thus, smaller dimensions, in particular in the axial direction, can be achieved for the rotor or stator since no additional installation space has to be reserved for the connection.

BRIEF DESCRIPTION OF THE SEVERAL
VIEWS OF THE DRAWINGS

Subsequently, embodiments of the invention are discussed in greater detail with reference to the accompanying drawings, in which:

FIGS. 1, 2, 3, 4, 5, 6, 7, 8, 9, 10 and 11 are a sequence of a method for producing a coil winding, which show, in the upper portion a, in each case a schematic end-face view of a winding device with three circumferential holding devices for carrying out the method; in the middle portion b, in each case a top view of the winding device; and in the lower portion c, in each case only the coil turns already produced with this step in plan view;

DESCRIPTION OF SPECIFIC EMBODIMENTS
OF THE INVENTION

Figure 1:
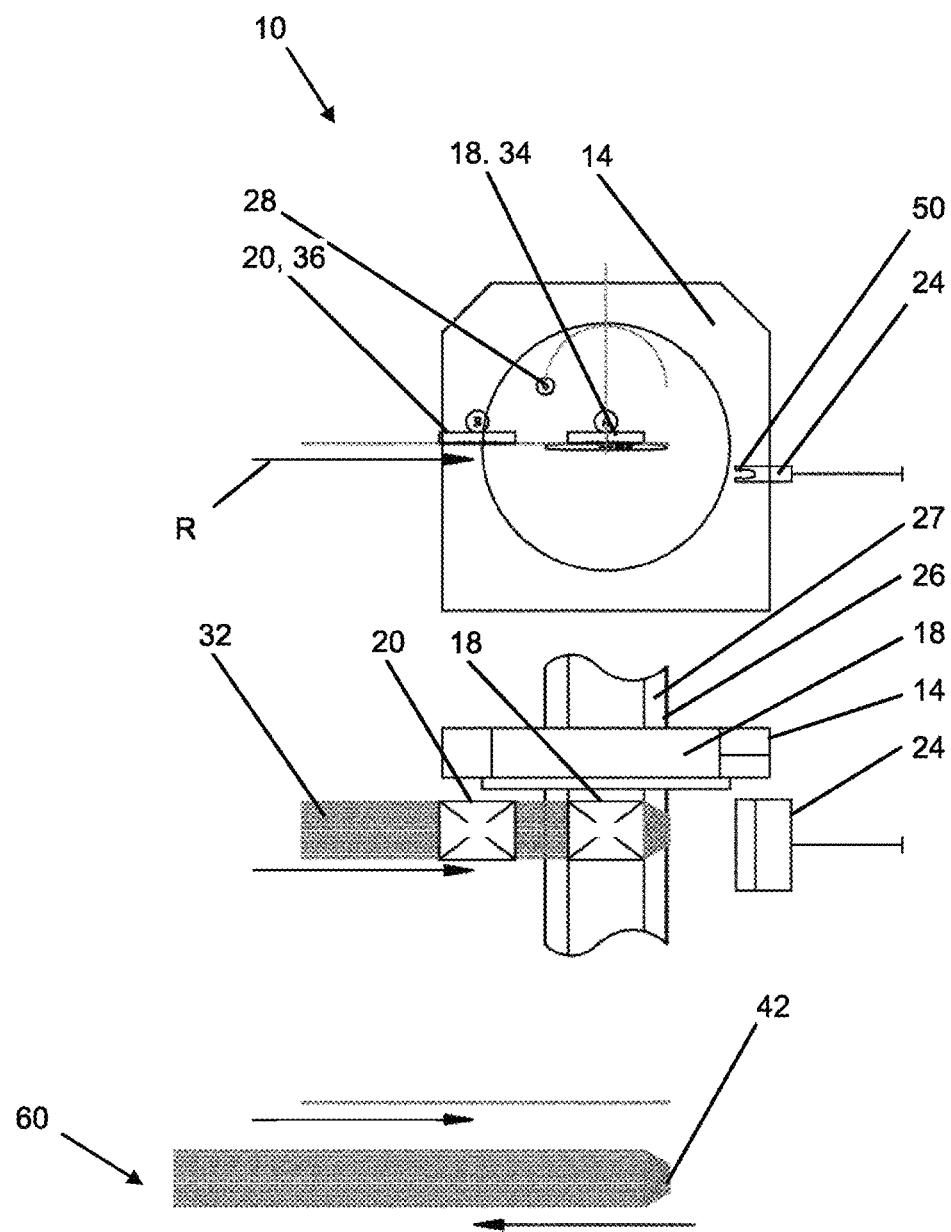

FIG. 1 shows the starting position at the beginning of a method for producing a coil winding 70 (see FIG. 16) for a stator of an electric motor (not shown) with a wire pack 60 produced in accordance with the steps shown in FIGS. 12 to 15. Such a coil winding 70 or distributed wave winding is also referred to as a bar wave winding.

For this purpose, a winding device 10 is provided in the embodiment shown, which winding device has a winding head with a wire handling device 14, which wire handling device has three holding devices 18, 20, 22 (see also FIG. 3) and a winding head forming device 24.

The winding device 10 works together with a winding former 26 designed as a flat former, i.e., it has a strip-like shape. The cross section of the winding former 26 is shown in the upper part of the illustration in FIG. 1, from which cross section the edge regions 27 of the winding former 26 tapering towards the flanks, and a radius of the flanks themselves, become clear.

The length of the winding former 26 (not shown in full length) is determined by the length of the coil winding 70 to be produced and the precise configuration of the method, the length of the winding former 26 not having to correspond to the length of the coil winding 70. The winding former 26 can, for example, be considerably shorter than the coil winding 70 if the coil winding 70 is already successively passed on from the winding former 26 to a transmission device (not shown) in the course of the method.

The winding device 10 is also associated with a wire rolling device 28 which, during the rotation processes, carries out roll forming of wires 32 to be processed for better contact with the winding former 26.

The method sequence is as follows. According to FIG. 1, a first holding device (A) 18 is in a waiting position spaced from the winding former 26.

A second holding device (B) 20 is in a released position of rest, so that the wire pack 60 passing through is not jammed. In the embodiment shown, a wire pack 60 with twelve wires 32, each connected in pairs, is processed. The wires 32 are guided parallel to one another.

Starting from FIG. 1, the wire pack 60 is arranged on the winding former 26 in such a way that its winding head 42 rests at least partially on the winding former 26. The wire pack 60 can pass the not yet jammed second holding device (B) 20 unhindered.

Subsequently, the first holding device (A) 18 is moved from its rest position into a holding position that is approximated to or adjacent to the winding former 26. With the triggering, a first holding point is defined in a first holding region 34 on the upper side of the flat winding former 26. In the temporal proximity to the jamming of the wire pack 60 in the first holding region 34, triggering of the second holding device (B) 20 takes place such that a second holding region 36 of the wires is defined, which second holding region is at a specific distance from the first holding region 34. The second holding region 36 lies next to the first holding region 34 in the feed direction R.

Figure 2:
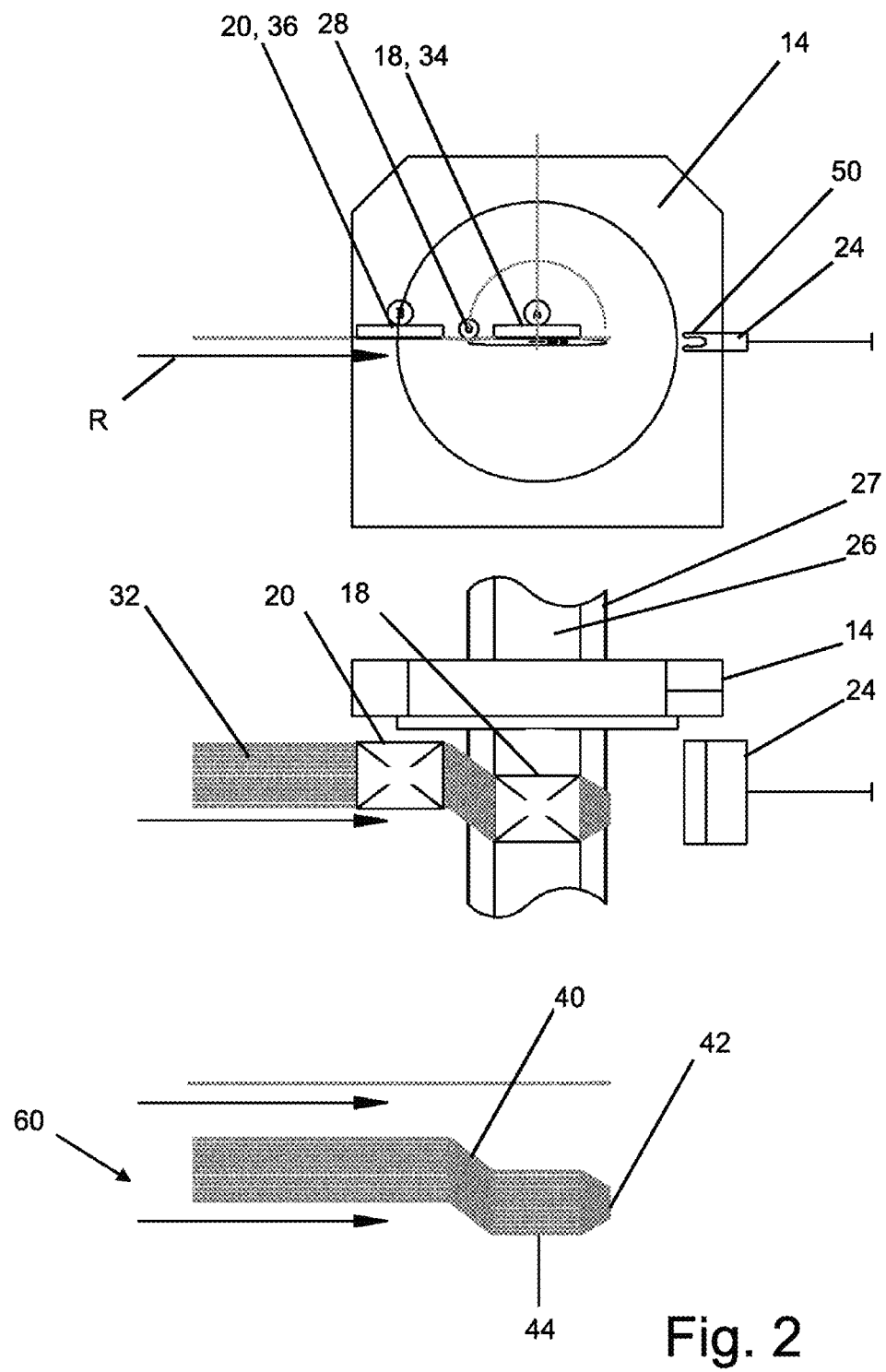

Furthermore, FIG. 2 illustrates a method step in which inclined wire portions 40 are produced. These wire portions 40 later form further winding heads 42 between straight legs 44 which come to lie in slots of a stator or rotor. The winding heads 42 will be discussed in greater detail in the subsequent method step and also later.

Figure 3:
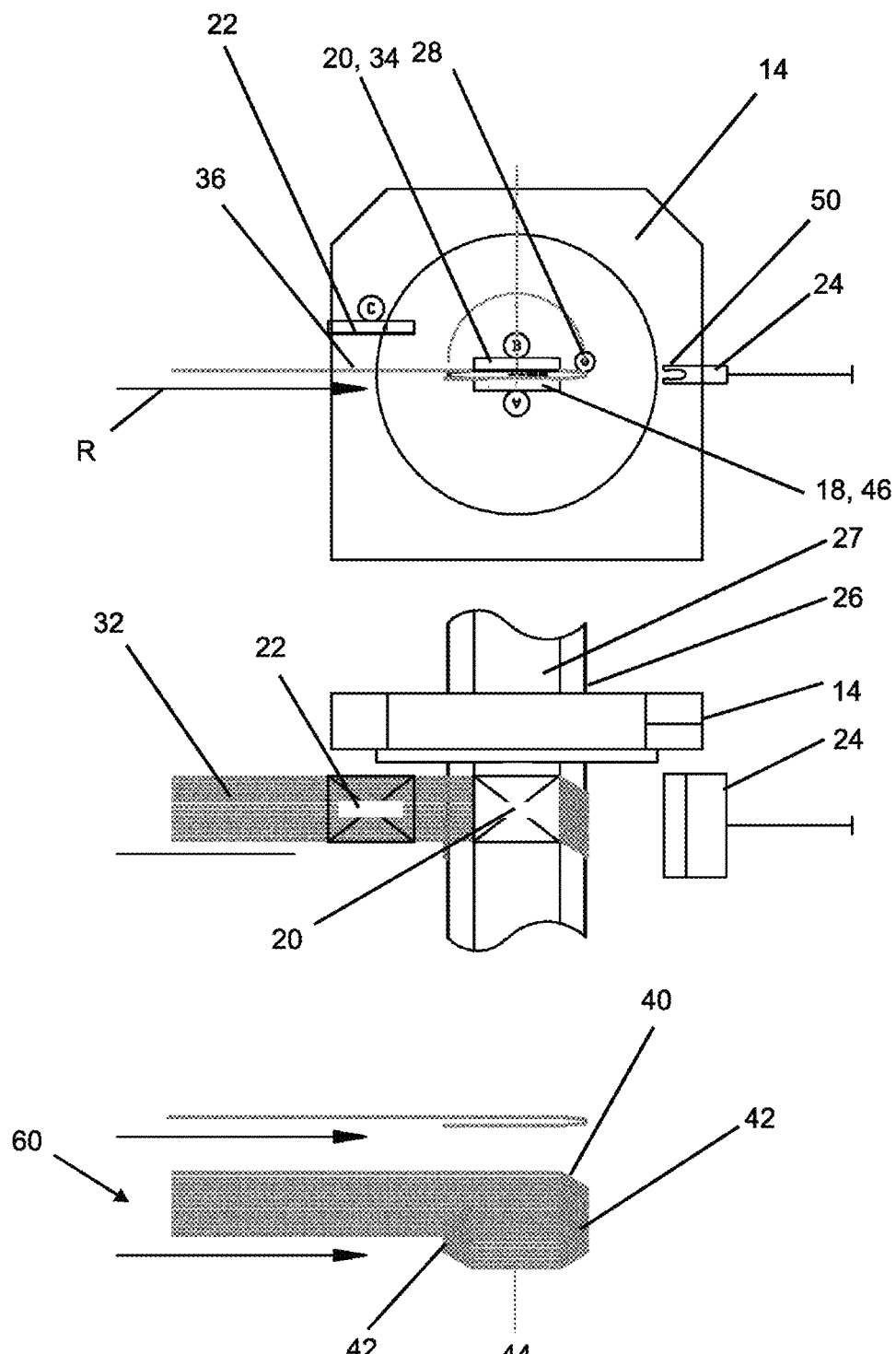

In FIG. 2, compared to FIG. 1, it can also be clearly seen that the second holding device 20 is brought closer to a wire handling device 14 by a displacing step, because the length of the inclined portions 40 should preferably correspond to the distance between the first holding region 34 and the second holding region 36 in FIG. 3. This readjusting movement is guided and can take place by active tracking or by a passive compensating movement.

After the step shown in FIG. 2 of displacing the wire portions fixed in the first holding region 34 relative to the wire portions fixed in the second holding region 36 with the formation of the inclined wire portions 40, the rotating device 28 is activated and rotates the winding former 26, and the first holding device (A) 18, which is also coupled to it in the direction of rotation, from the first holding region 34 into a third holding region 46 shown in FIG. 3, the second holding device (B) 20, which is jammed in an unchanged manner with the wires 32, being taken along from the second holding region 36 into the first holding region 34 and the wire pack 50 being fed further in the feed direction R.

The inclined wire portion 40 is transferred to the roof-shaped winding heads 42 already mentioned by the rotation of the winding former 26, because the wires 32 cling to the flanks 27 of the winding former 26, the winding heads 42 tapering towards turning points 48 corresponding to the shape of the flanks 27. Bending radii for each of the wires 32 of the wire pack 60 are formed at the turning points 48 themselves. In FIG. 3, the third holding device (C) 22 is also shown for the first time, but in this case it is still in a rest position because it is only used later in the method sequence.

Figure 4:
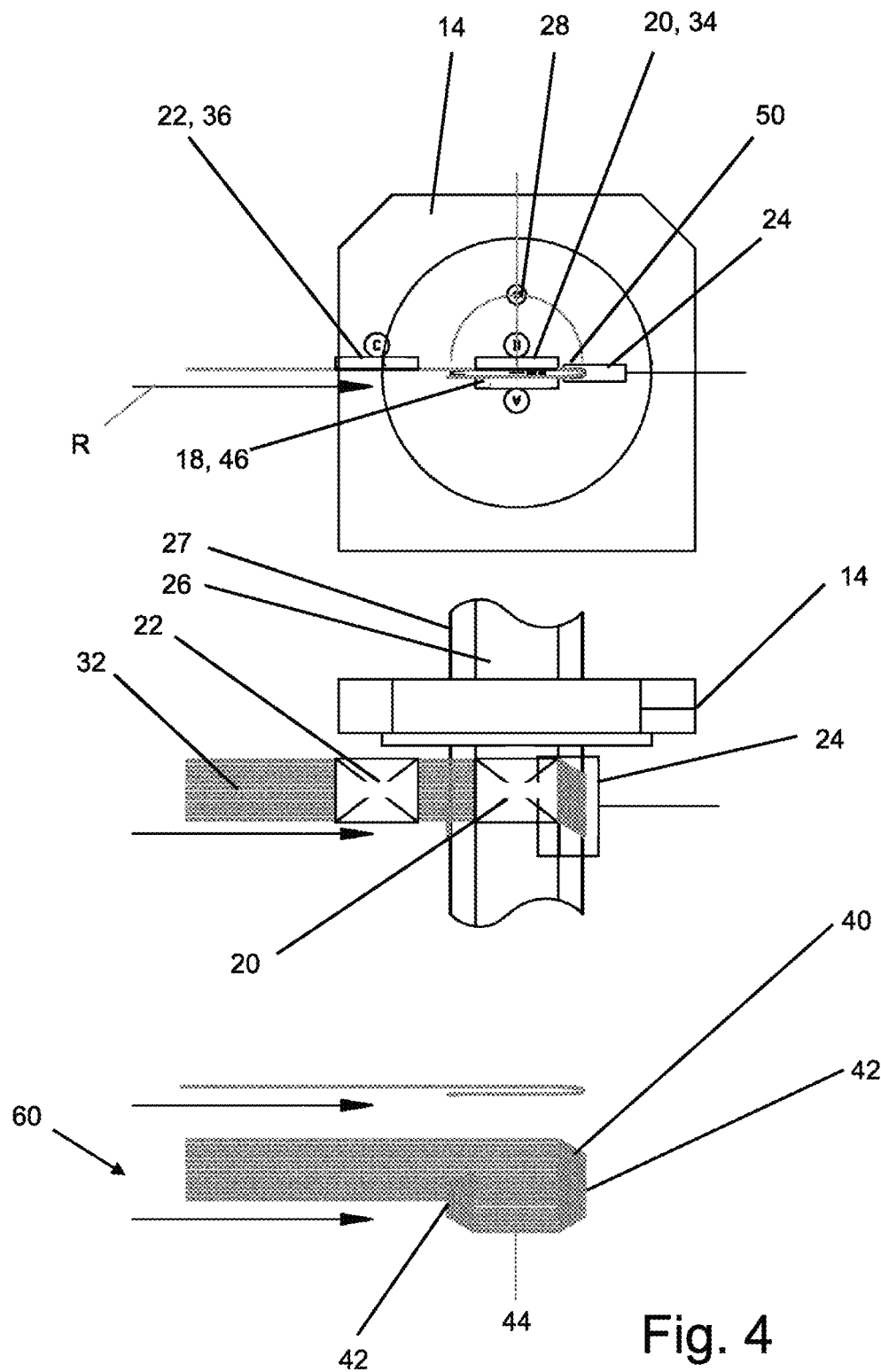

FIG. 4 illustrates an optional step in which the previously produced winding heads 42 are given a final shape by means of the wire forming device 24. The wire forming device 24 has a forming element 50, which is designed as a negative shape of the winding heads 42 in its desired end shape and is pressed against the winding heads 42 under pressure.

In preparation for the next method steps, the third holding device (C) 22 is moved into the second holding region 36. The first holding device (A) 18 can also already be released, but can also remain jammed with the wires 32 of the wire pack 60 in the third holding region 46 during the next method step.

The next method step, which is shown in FIG. 5, again provides for the formation of inclined wire portions 40 between the holding point in the second holding region 36 previously produced by triggering the third holding device (C) 22 and the holding point created by the second holding device (B) 20, which second holding device is still jammed and is still located in the first holding region 34.

This in turn takes place by relative axial displacement of the jammed holding devices (in this case: holding device (B) 20 and holding device (C) 22) in the first and second holding regions 34, 36 parallel to the axis of rotation of the winding former 26.

If the third holding device (C) 22 is still jammed, which can be advantageous for reasons of stabilising the already produced part of the coil winding 70, the holding device (A) 18 moves in the third holding region 46 with the holding device (B) 20 in the first holding region together axially relative to the holding device (C) 22 in the second holding region 36.

Figure 5:
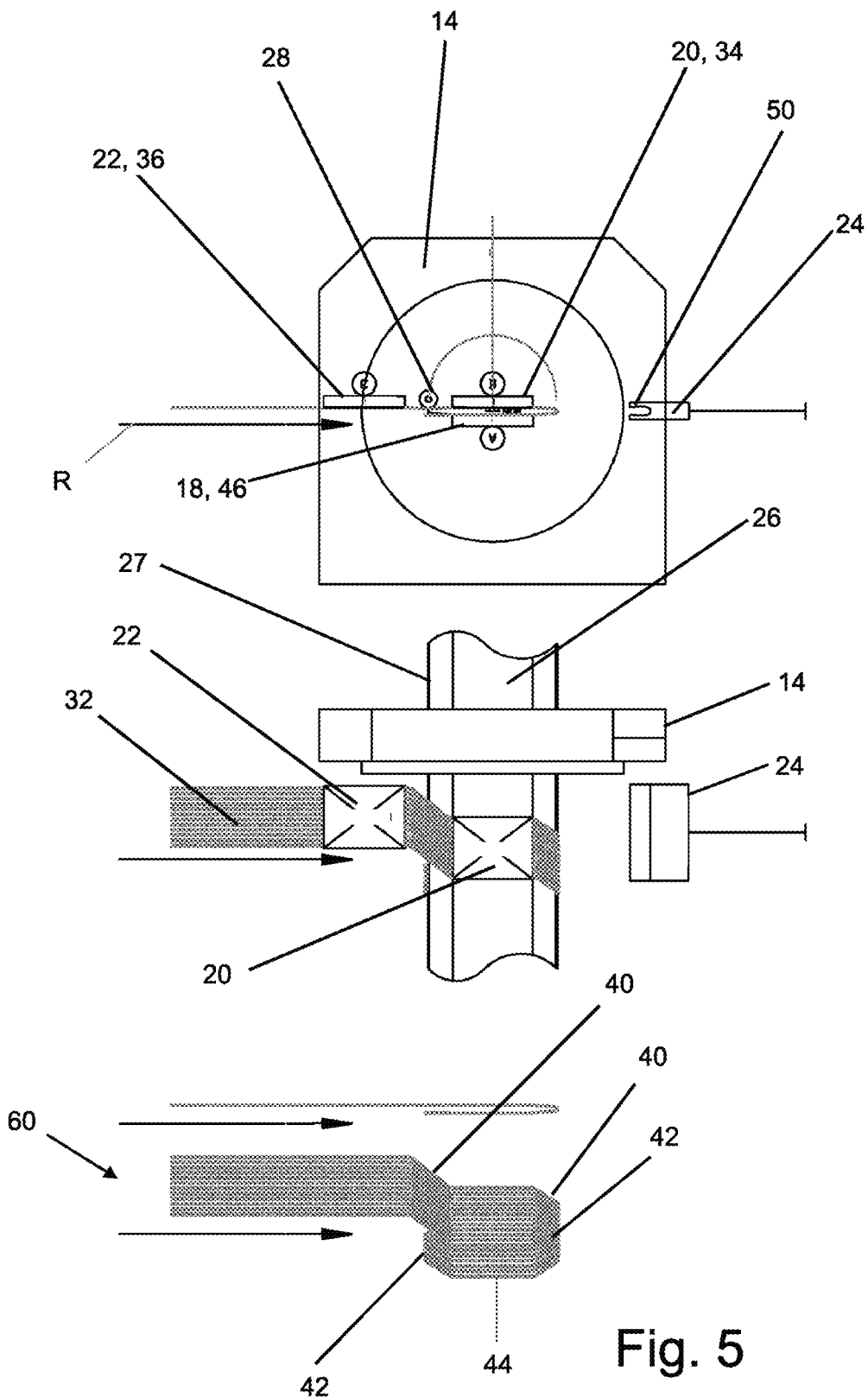

In the bottom of FIG. 5, it can be seen that, after this step, a first portion of parallel legs 44, produced in the step according to FIG. 2, is located on the underside of the winding former 26 laterally offset to the wires 32 of the wire pack 60 fed in from the feed direction R.

This means that, when a winding process is subsequently carried out again through 180° by correspondingly rotating the winding former 26, the first wire portion produced does not interfere with the subsequent wires. The explanations relating to FIG. 3 also apply mutatis mutandis to the winding process according to FIG. 5, but the holding devices 18, 20, 22 are located in different holding regions.

Figure 6:
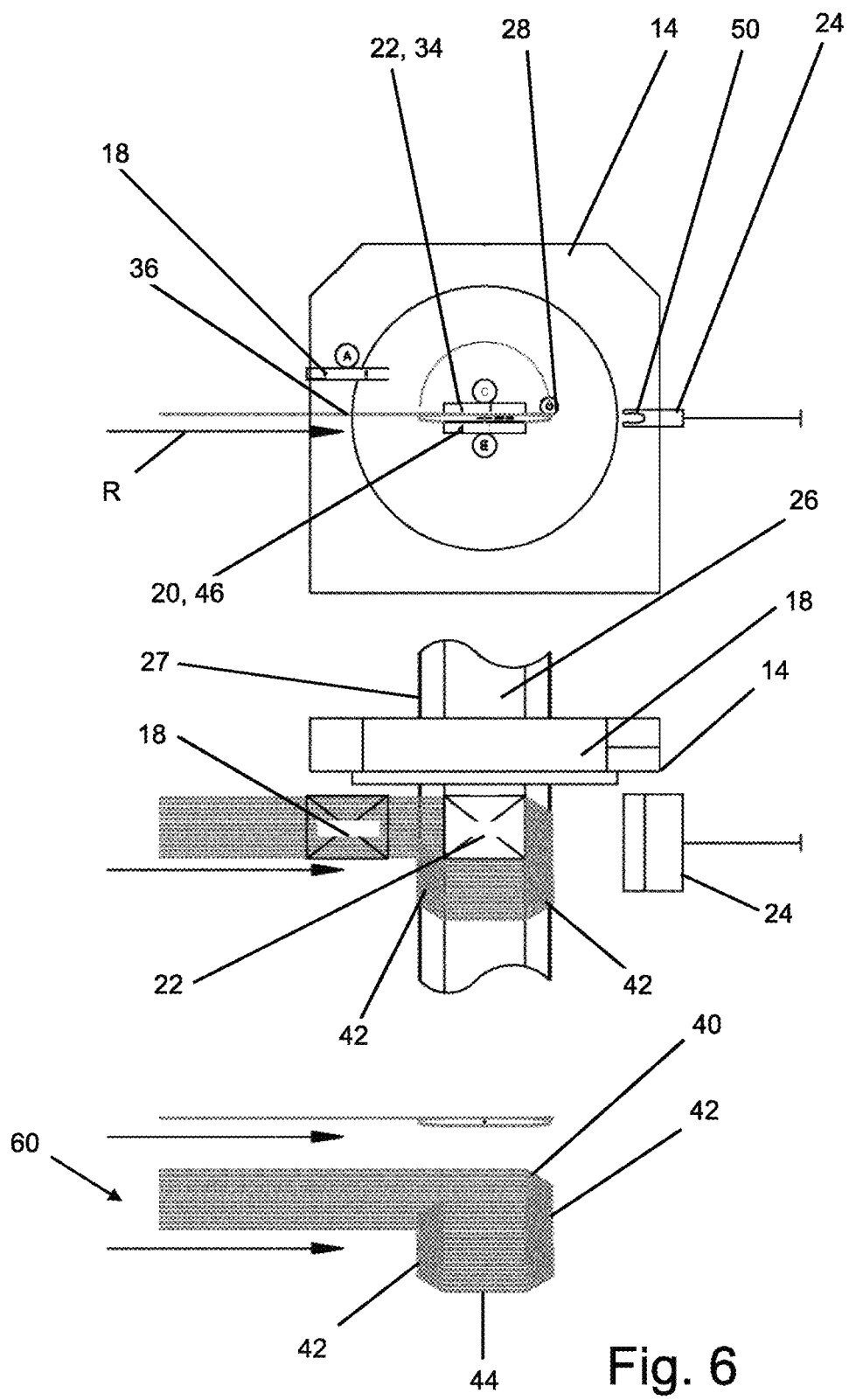

FIG. 6 (bottom) shows a complete first turn of the future coil winding on the winding former 26 with winding heads 42 on both sides of the straight legs 44, which later lie in the slots of the stator or rotor 80.

Figure 7:
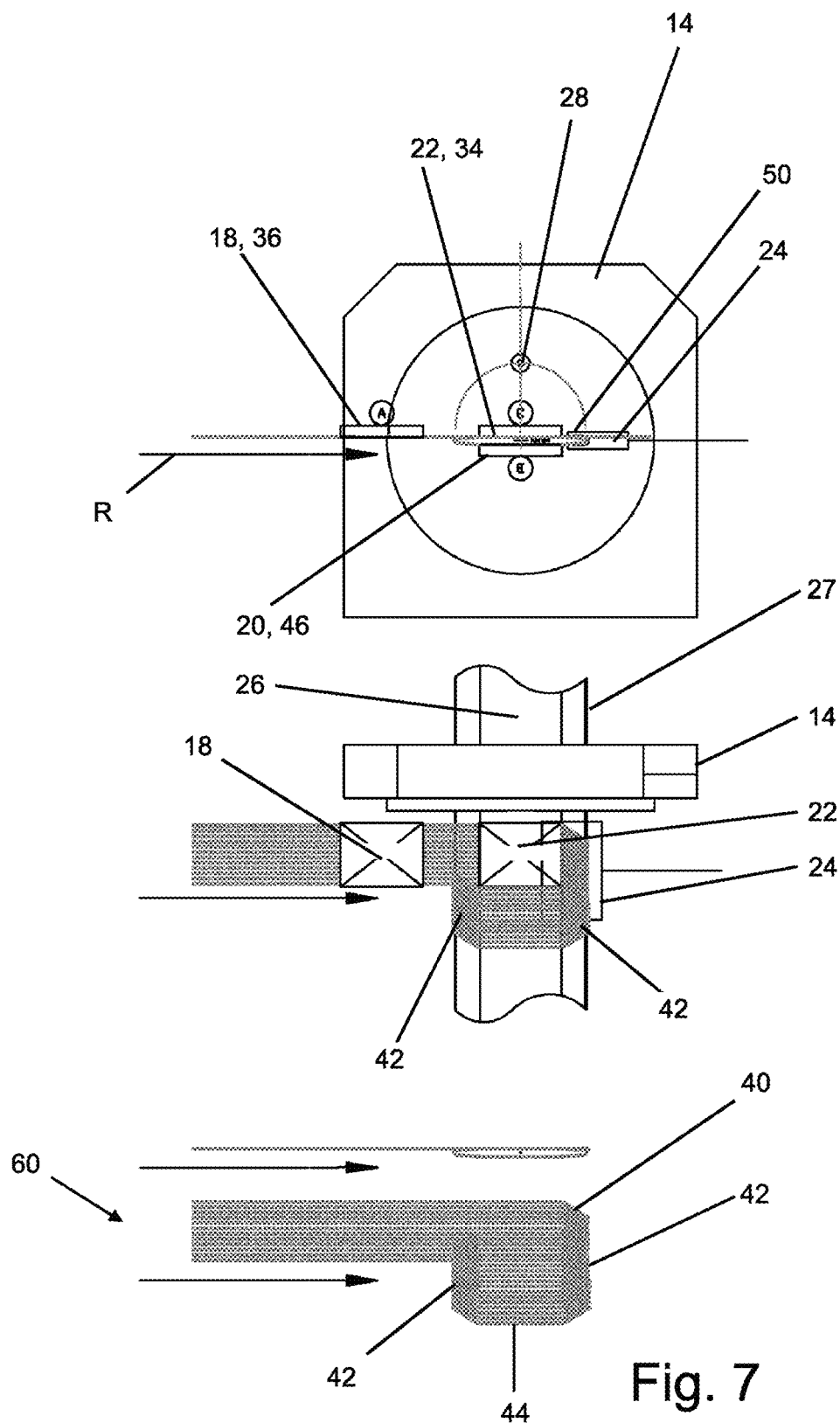

As illustrated in FIG. 7, an optional step of shaping the winding heads 42 takes place again subsequently by means of the forming element 50 of the wire forming device 24, which has already been explained in connection with FIG. 4, in order to optimise the shaping of the winding heads 42.

Subsequently, the method steps shown in FIGS. 2 to 7 are repeated correspondingly to the number of turns of the coil winding 70 required but the arrangement of the holding devices 18, 20 and 22 changes and does not always correspond to the position of the holding devices shown there since these change their relative position after each run, as is readily apparent to a person skilled in the art from the different arrangement in FIGS. 2 to 4 on the one hand, and FIGS. 5 to 7.

The sequence is of course repeated regularly so that the holding devices 18, 20, 22 return to their corresponding position with every third winding process through 180°.

Figure 8:
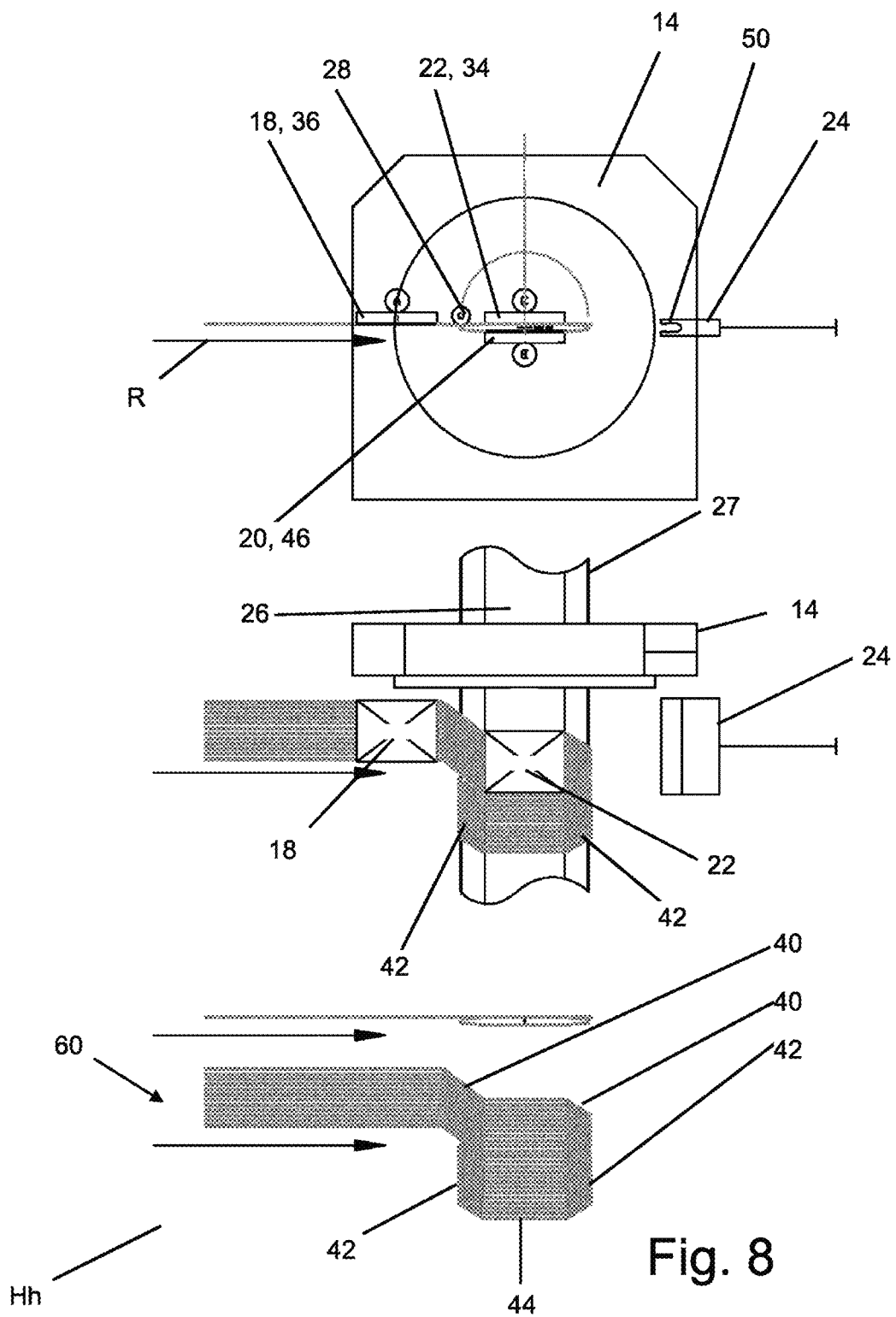
Figure 9:
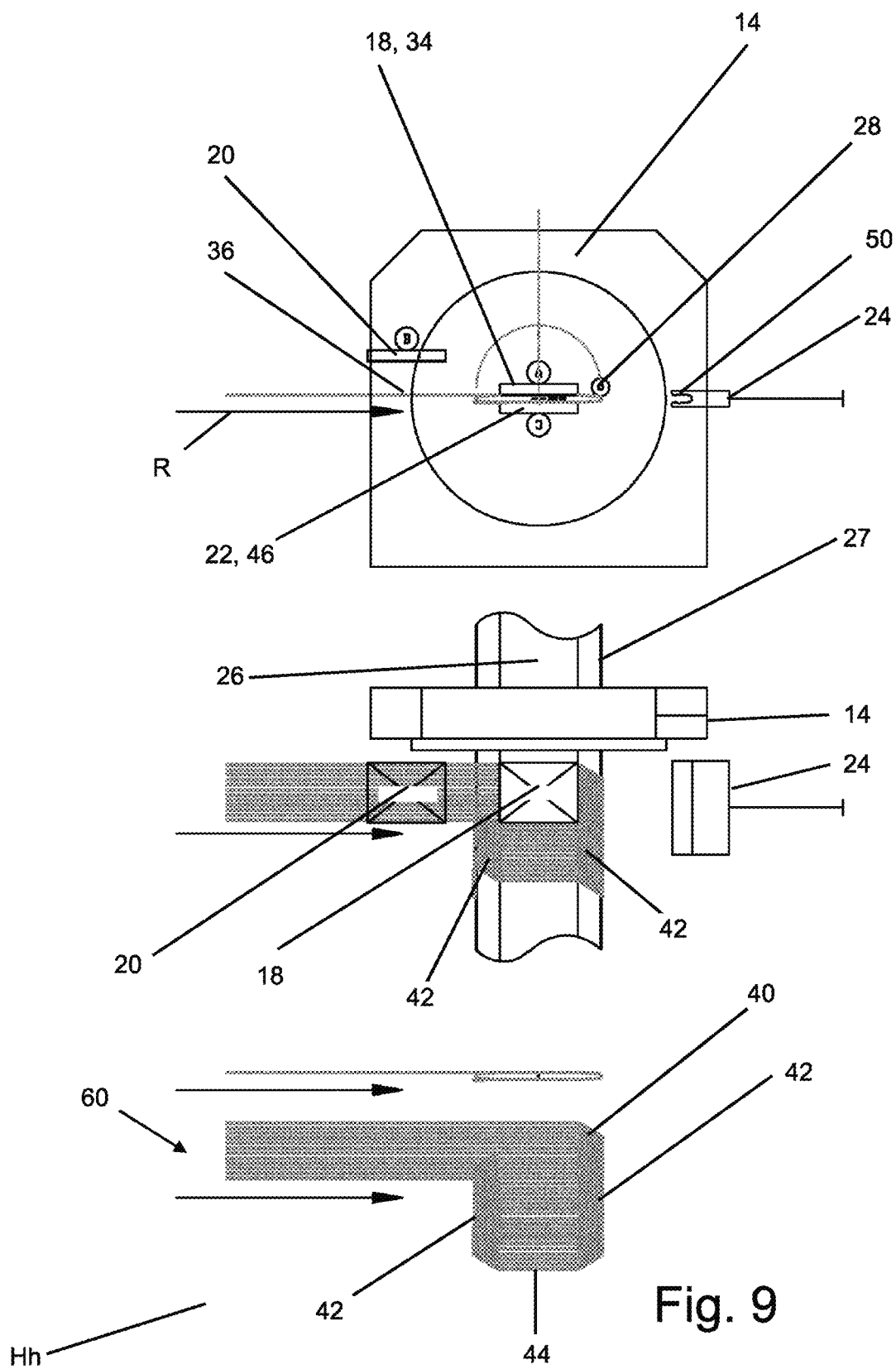
Figure 10:
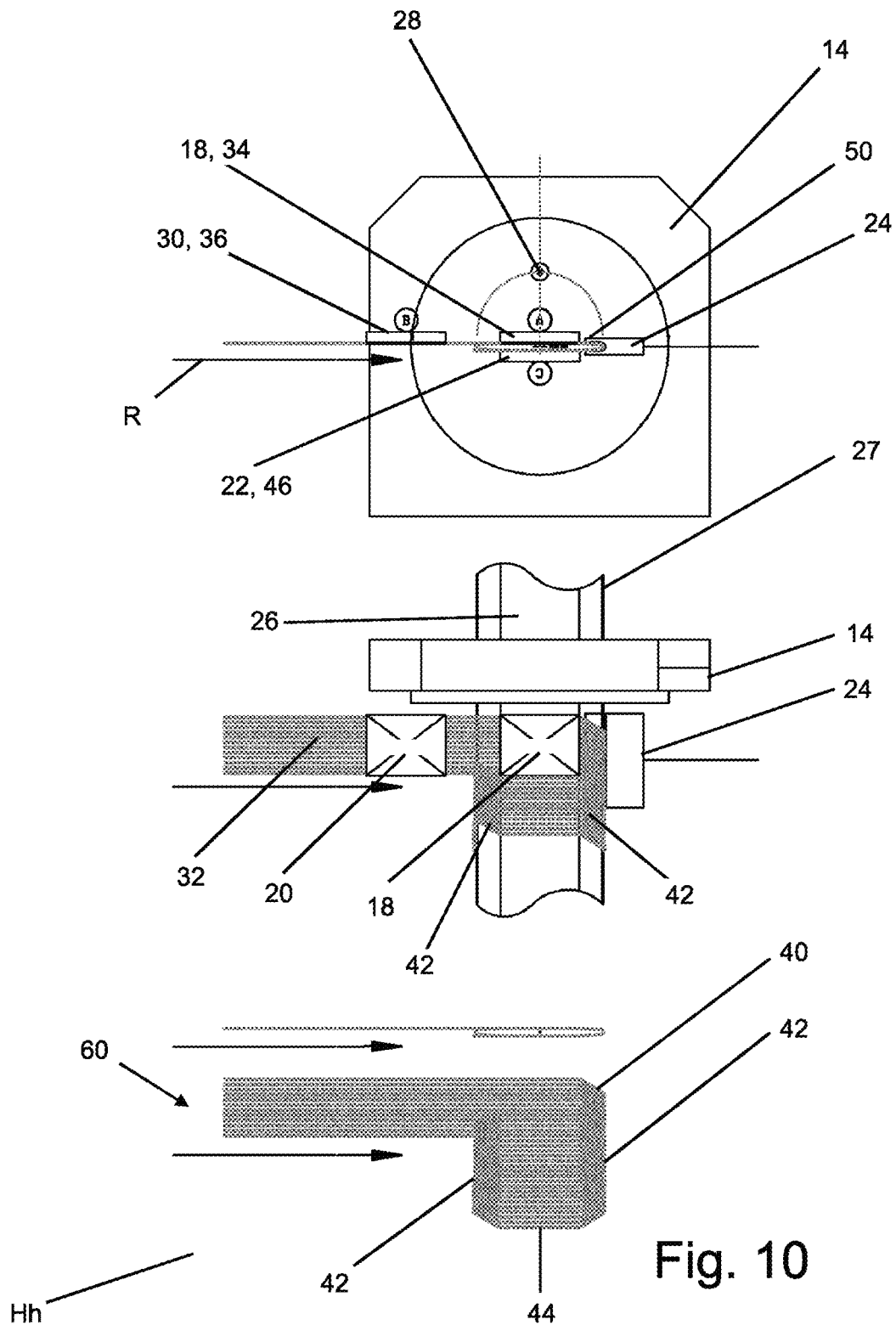

FIGS. 8 to 10 show a final sequence of the method steps according to FIGS. 5 to 7, the arrangement of the holding devices 18, 20 and 22 according to the sequence described above being located at a different holding point 34, 36, 46 each.

Figure 11:
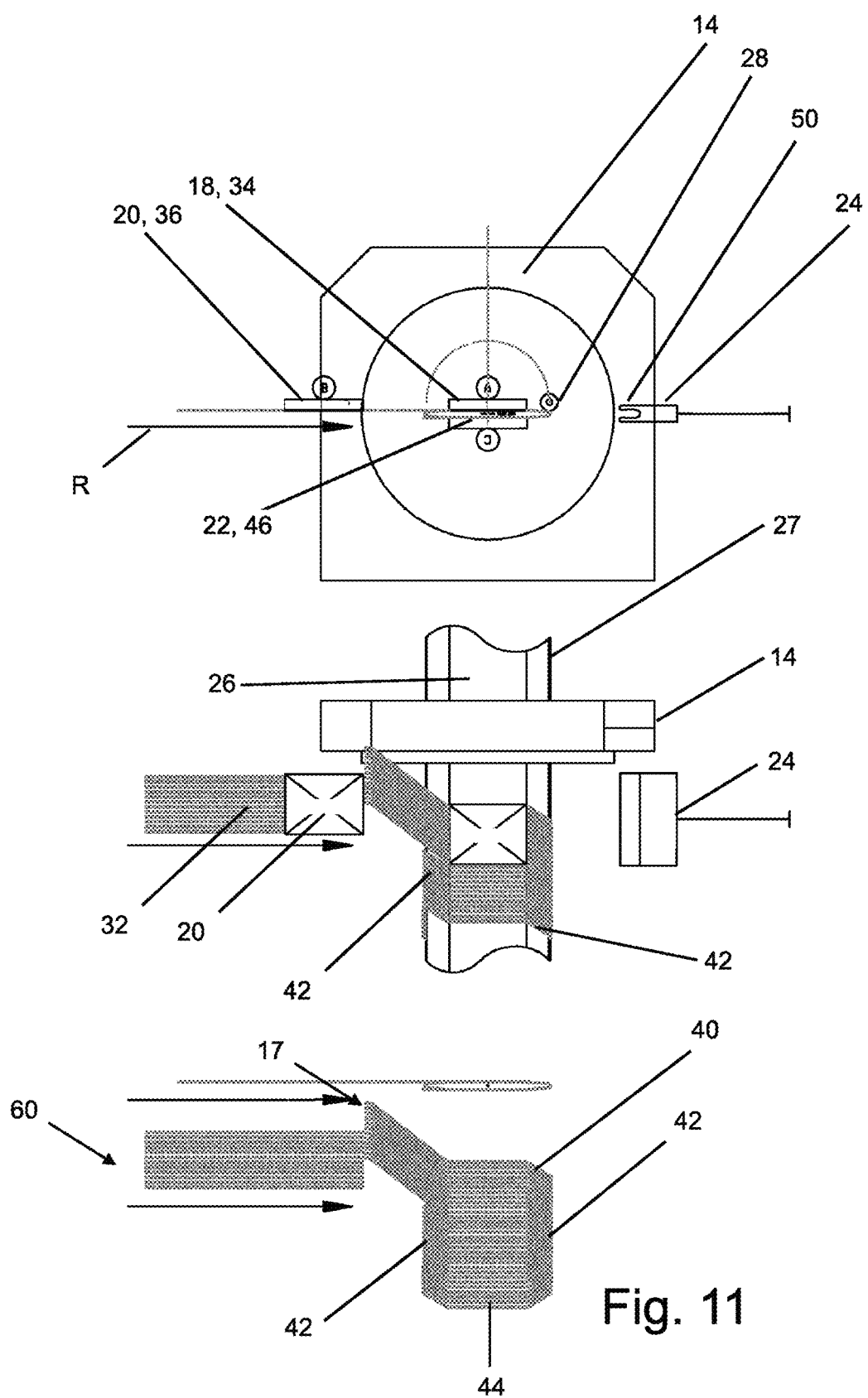

The final step for producing the complete coil winding 70 is shown in FIG. 11. At this point in time, a number of straight legs 44 have been produced which are desired for equipping the rotor slots or stator slots 82. In FIG. 11, however, only a shortened coil winding 70 is shown for the sake of better clarity.

The method described above ensures that all connecting wires 17 (see FIG. 15) of the finished coil winding 70 lie on one side.

FIG. 11 shows a final method step. Before the finished coil winding 70 is separated from the fed wire pack 60 by means of a cutting device (not shown), a final displacement process of the first holding region 34 (in this case again using the jammed first holding device (A) 18) relative to the second holding region 36 (in this case the holding device (B) 20) parallel to the axis of rotation of the winding former 26. After the cut off process of the wires 32, the wire ends inclined with respect to the legs 44 form connecting wires 17 which serve as electrical connections for the coil winding 70. After the cut off process of the wire ends from the fed wire pack 60, the finished coil winding 70 is then transferred in a manner known per se to the stator 80 or rotor, whereby it is first stripped from the winding former and, if necessary, placed in a transfer device (not shown) in an intermediate step.

The method is not specified, in particular with regard to the number of wires processed in parallel, which number is indicated as twelve in the embodiment shown and described. Any even number of wires can be processed in parallel for a distributed wave pattern of coil winding 70. In the event that a non-distributed wave pattern is to be produced for a winding, but the method is suitable for practically any number of wires 32. As already mentioned, the method is intended in particular for the production of coil windings 70 from flat wires which have a rectangular cross section.

Figure 12:
FIGS. 12, 13 and 14 show a sequence of steps for producing a wire pack with wires connected in pairs at one end of the wire pack.
Figure 13:
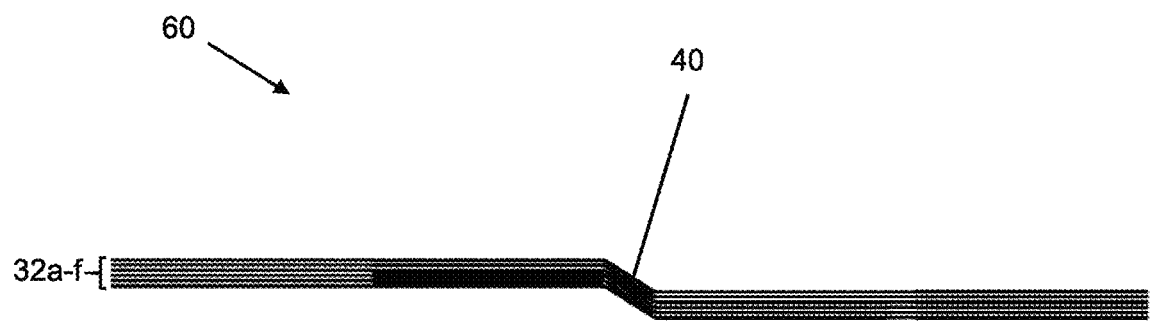
Figure 14:
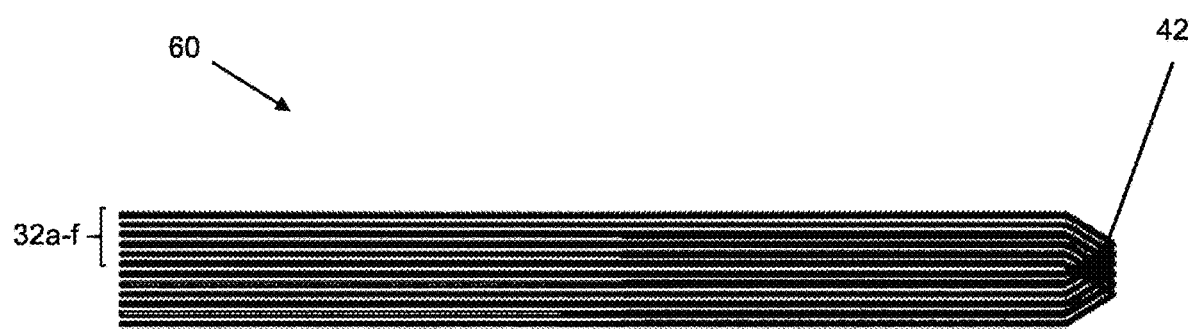

FIGS. 12 to 14 show how the wire pack 60 fed to the winding device 10 in the first method step is produced. The wire pack 60 is first produced in that twice the length of the wires 32 required for the coil winding 70 (FIG. 12) is determined and the wires 32 or the wire pack 60 are/is provided.

FIGS. 12 and 14 show how the connection of the wires 32 for the wire pack 60 is produced. This is done by bending over the wires 32 to the length required for the production of the coil winding 70, so that the wires 32 are connected to one another in pairs at one end of the wire pack 60. A device such as that used for the method according to FIGS. 1 to 11 can be used for this purpose, the first winding head 42 (see FIG. 14) being preferably produced at approximately half the determined wire length by means of the method described above by displacing the holding devices for producing the inclined wire portions 40 and by rotating the winding former 26.

Figure 15:
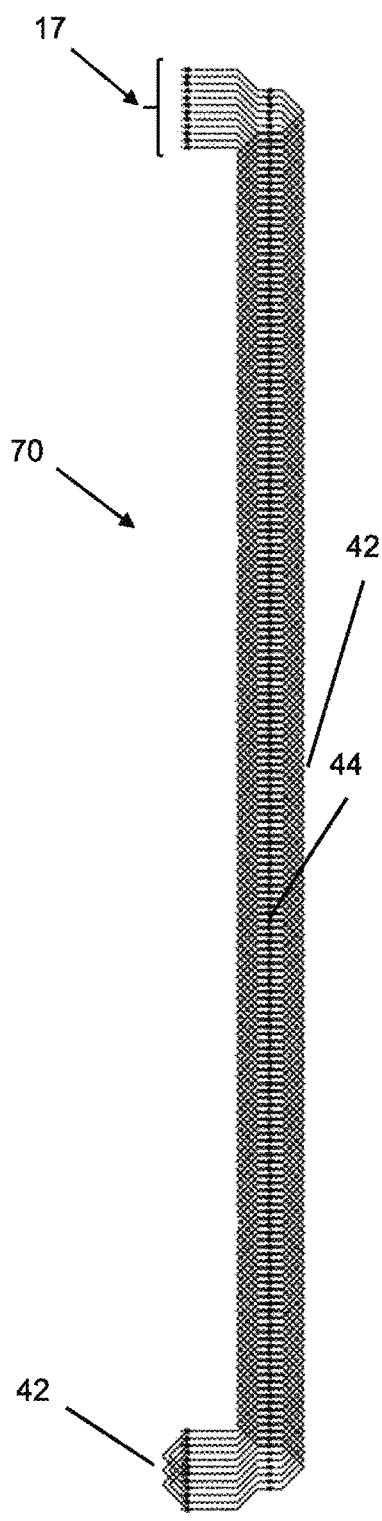
FIG. 15 is a plan view of a coil winding produced in accordance with the method.

FIG. 15 shows a prefabricated coil winding 70 in the flat state, this position corresponding to the state in which the coil winding 70 lies on the strip-shaped winding former 26 but which is not shown. This illustrated coil winding 70 is a coil winding 70 which was produced from a wire package 60 originally made up of six individual wires 32a-f according to FIGS. 12 to 14, so that twelve connecting wires 17 are available on one side of the coil winding 70 after the production method according to FIGS. 1 to 11.

The basic procedure in the method does not change if, for example, six parallel wires 32 are not fed for the production of the wire pack 60 but only three or some other integer multiple of three. The axial path increases or decreases correspondingly when displacing and forming the inclined transition regions 40 between the straight legs 44.

Figure 16:
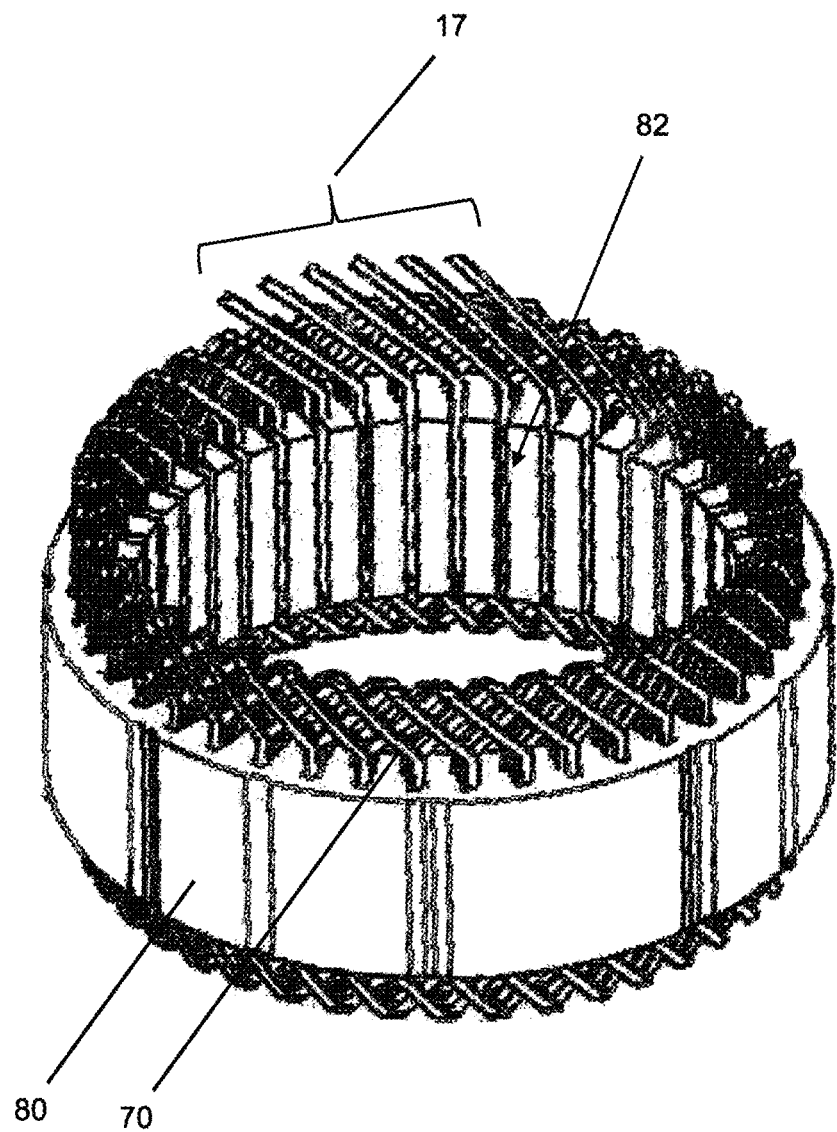
FIG. 16 is a view of a stator, in the slots of which the winding from FIG. 15 is received.

FIG. 16 shows, by way of example, a stator 80 in which the coil winding 70 is inserted in stator slots 82. The connecting wires 17 lie on an axial end face of the stator 80, which facilitates their connection. In the embodiment shown, it can also be seen that the length of the coil winding 70 is a multiple of the circumference of the stator 80, in the embodiment shown it is twice the length. Particularly in the case of rectangular cross sections, excellent degrees of filling of the slots 82 can be achieved with stators produced in this way, so that the compact motors have a high level of efficiency. In this embodiment of a stator with an inserted coil winding 70, a coil winding 70 with six connecting wires is shown, an above-described coil winding 70 with a number of wires 32 corresponding to another integral multiple of three also being used.

LIST OF REFERENCE SIGNS

10 Winding device
14 Wire handling device
17 Connecting wires
18 First holding device
20 Second holding device
22 Third holding device
24 Wire forming device
26 Winding former
26 Winding former
27 Flanks
32 Wires
32a-32f Single wire
34 First holding point
36 Second holding point
40 Inclined wire portions
42 Winding head
44 Straight legs
46 Third holding point
50 Forming element
60 Wire pack
70 Coil winding
80 Stator
82 Stator slots
R Feed direction

What is claimed is:

1. Method for producing a coil winding (70) for insertion into radially open slots (82) in a rotor or stator (80) of an electrical machine, wherein the coil winding (70) has a wire pack (60) consisting of a number of wires (32), wherein the wires (32) of the wire pack (60) run parallel to one another and are connected to one another in pairs at one end of the wire pack (60), wherein the wires connected to one another in pairs are formed in one piece from a continuous single wire (32a, 32b, 32c, 32d, 32e, 32f) which is bent over at one end of the wire pack (60), the shape of the bending of all continuous individual wires (32a, 32b, 32c, 32d, 32e, 32f) corresponding to the shape of a winding head (42), and wherein further the coil winding (70) is formed by a unidirectional flat winding former (26) which can be rotated about an axis of rotation, comprising the method steps of:
   a) feeding the wire pack (60) used for the coil winding (70) perpendicular to the winding former (26);
   b) holding the wire pack (60) at a fixing point in a first holding region (34) on the winding former (26);
   c) holding the wire pack (60) at a fixing point in a second holding region (36) at a distance in front of the winding former (26) with respect to the feed direction (R);
   d) displacing the first holding region (34) relative to the second holding region (36) in a direction parallel to the axis of rotation of the winding former (26) to form a wire portion (40) inclined with respect to the feed direction (R) between the first holding region (34) and the second holding region (36);
   e) rotating the winding former (26) by 180° about the axis of rotation while feeding the wire pack (60) from the feed direction (R), wherein the fixing point is displaced from the first holding region (34) into a third holding region (46) on the side of the winding former (26) opposite the first holding region (34), and the fixing point is displaced from the second holding region (36) into the first holding region (34), whereby a winding head (42) extending around the winding former (26) is formed for the wire pack (60) with the formation of a bending region;
   f) fixing the wire pack (60) after subsequent feeding at a fixing point in the second holding region (36);
   g) repeating steps d) to f), wherein the holding effect at the fixing point in the third holding region (46) is released before or after the repetition of step f), and the holding effect at the second fixing point is released before the repetition of step e);
   h) repeating steps b) to g) until the coil winding (70) is complete;
   i) severing the wire pack (60) in a region of the second holding region (36);
   j) stripping the coil winding (70) from the winding former (26).

2. Method according to claim 1, wherein the wire pack (60) is first produced in that twice the length of the wires (32) required for the coil winding (70) is determined, and the wire pack (60) is produced by bending over the wires (32) to the length required for the production of the coil winding (70), so that the wires (32) are connected to one another in pairs at one end of the wire pack (60).

3. Method according to claim 1, characterised in that the wire pack (60), beginning with the end at which the wires (32) are connected to one another in pairs, is fed perpendicular to the winding former (26).

4. Method according to claim 1, characterised in that the displacement in method step d) takes place parallel to the axis of rotation of the winding former (26) by a section, the length of the section being approximately equal to half the distance between the outermost wires of the wire pack (60) in relation to all wires, whereby a wire portion (40) inclined with respect to the axis of rotation of the winding former (26) is formed between the first and the second holding region (34, 36).

5. Method according to claim 1, characterised in that the winding heads (42) are reshaped in the bending region formed by step e).

6. Method according to claim 5, characterised in that, for the final shaping of the winding heads (42) after method step e), a profiled shaping tool (50) is pressed against the winding heads (42).

7. Method according to claim 1, characterised in that the wire pack is held in step b) by means of a first holding device (18) on the winding former (26) in the first holding region (34), and in step c) by means of a second holding device (20) in the second holding region (36).

8. Method according to claim 7, characterised in that the first holding region (34), the third holding region (46), and the second holding region (36) follow one another in this order in the direction of rotation of the winding former (26), and a first holding device (18) and the second holding device (20) are each respectively transferred with a rotation according to step e) from a holding region (34, 36, 46) to a subsequent holding region (34, 36, 46) in the direction of rotation.

9. Method according to claim 1, characterised in that the severing of the wire pack (60) in step i) takes place in a rotary position of the winding former (26), in which rotary position the end of the wire pack (60) with the wires connected to one another in pairs lies on the side of the second holding region (36).

10. Method according to claim 1, characterised in that the wires (32) connected in pairs are exchanged once or multiple times in pairs with other wires (32) connected in pairs in the course of the method during the feed before reaching the second holding region (36).

11. Method for producing a coil winding (70) for insertion into radially open slots (82) in a rotor or stator (80) of an electrical machine wherein the coil winding (70) has a wire pack (60) consisting of a number of wires (32), wherein the wires (32) of the wire pack (60) run parallel to one another and are connected to one another in pairs at one end of the wire pack (60), wherein the wires connected to one another in pairs are formed in one piece from a continuous single wire (32a, 32b, 32c, 32e, 32f) which is bent over at one end of the wire pack (60), the shape of the bending of all continuous individual wires (32a, 32b, 32c, 32d, 32e, 32f) corresponding to the shape of a winding head (42), and wherein further the coil winding (70) is formed by a unidirectional flat winding former (26) which can be rotated about an axis of rotation, comprising the method steps of:
   a) cutting the wire pack (60) to a predetermined length;
   b) feeding the wire pack (60) used for the coil winding (70) perpendicular to the winding former (26);
   c) holding the wire pack (60) at a fixing point in a first holding region (34) on the winding former (26);
   d) holding the wire pack (60) at a fixing point in a second holding region (36) at a distance in front of the winding former (26) with respect to the feed direction (R);
   e) displacing the first holding region (34) relative to the second holding region (36) in a direction parallel to the axis of rotation of the winding former (26) to form a wire portion (40) inclined with respect to the feed direction (R) between the first holding region (34) and the second holding region (36);

f) rotating the winding former (26) by 180° about the axis of rotation while feeding the wire pack (60) from the feed direction (R), wherein the fixing point is displaced from the first holding region (34) into a third holding region (46) on the side of the winding former (26) opposite the first holding region (34), and the fixing point is displaced from the second holding region (36) into the first holding region (34), whereby a winding head (42) extending around the winding former (26) is formed for the wire pack (60) with the formation of a bending region;

g) fixing the wire pack (60) after subsequent feeding at a fixing point in the second holding region (36), h) repeating steps e) to g), wherein the holding effect at the fixing point in the third holding region (46) is released before or after the repetition of step g), and the holding effect at the second fixing point is released before the repetition of step f);

i) repeating steps c) to h) until the coil winding (70) is complete;

j) stripping the coil winding (70) from the winding former (26).

\* \* \* \* \*